United States Patent [19]
Huh

[11] Patent Number: 5,919,243
[45] Date of Patent: Jul. 6, 1999

[54] WORK BRAKE APPARATUS FOR WHEEL TYPE EXCAVATOR

[75] Inventor: Tae Kyu Huh, Changwon, Rep. of Korea

[73] Assignee: Volvo Construction Equipment Korea Co., Ltd., Kyongnam Province, Rep. of Korea

[21] Appl. No.: 08/762,918

[22] Filed: Dec. 10, 1996

[30] Foreign Application Priority Data

Dec. 29, 1995 [KR] Rep. of Korea ..................... 95-65555

[51] Int. Cl.⁶ ................................................ B60K 28/10
[52] U.S. Cl. ................................. 701/50; 303/10; 303/13; 701/51; 701/70; 180/244; 180/306; 180/6.2; 188/170
[58] Field of Search ................................. 701/50, 51, 70; 180/244, 306, 6.2; 60/436; 303/10, 13; 188/170

[56] References Cited

U.S. PATENT DOCUMENTS

| | | |
|---|---|---|
| 4,254,845 | 3/1981 | Braun . |
| 4,428,621 | 1/1984 | Taki et al. . |
| 4,456,311 | 6/1984 | Houtz . |
| 4,520,625 | 6/1985 | Sato et al. . |
| 4,660,696 | 4/1987 | Kusaka . |
| 4,729,222 | 3/1988 | Tanaka et al. . |
| 5,366,040 | 11/1994 | Irikura et al. . |
| 5,507,360 | 4/1996 | Simmons . |
| 5,529,134 | 6/1996 | Yomogita ................................. 180/6.2 |
| 5,599,073 | 2/1997 | Huh .......................................... 303/10 |

*Primary Examiner*—William A. Cuchlinski, Jr.
*Assistant Examiner*—Olga Hernandez
*Attorney, Agent, or Firm*—Harness, Dickey & Pierce, P.L.C.

[57] ABSTRACT

A work brake apparatus for a wheel type excavator having a travelling device, a suspension device, and a service brake device. The work brake apparatus comprises: a first means, which is connected to the forward/backward lever of the travelling device, for unlocking the suspension device as the suspension locking solenoid valve switches over in response to a predetermined signal when the forward/backward lever switches over to its forward or backward position, and a second means, which is connected to the forward/backward lever of the travelling device, for keeping the service brake applied as the service brake valve switches over in response to a predetermined pilot pressure when the forward/backward lever switches over to its neutral position.

5 Claims, 4 Drawing Sheets

WORK BRAKE APPARATUS FOR WHEEL TYPE EXCAVATOR

BACKGROUND OF THE INVENTION

1. Field of the Invention

The present invention relates to a work brake apparatus for a wheel type excavator, and more particularly to a work brake apparatus improved for preventing the equipment from being pulled by an excavating power via keeping a suspension device locked and via applying a service brake when the wheel type excavator is at work.

2. Description of the Prior Art

Generally, a work brake apparatus for a wheel type excavator is operated by manipulating a suspension device, a service brake device, a parking brake device and a forward/backward travelling manipulation device. The respective device is installed separately as shown in FIG. 1, and the construction and the operation thereof will be described in the following.

First, the operation of the service brake device will be described. The oil discharged by a pump 2a driven by an engine 1 is accumulated in an accumulator 4 through a cut-off valve 3. If a service brake pedal 5a is pressed by a user at this time, a service brake valve 5b switches over. Then, the oil is supplied to a service brake cylinder 7 through a pilot check valve 6. Therefore, the equipment can be kept at rest.

And, when the parking brake device operates, the oil discharged by a pump 2b is pressurized by a relief valve 22. At this time, if a parking brake switch 9 is manipulated by the user, a parking brake valve 8 switches over such that the oil may apply a pilot pressure to the pilot check valve 6. Then, the pilot check valve 6 switches over to its open state such that the oil may be supplied to a parking brake cylinder 10. Therefore, the parking brake can be kept unlocked.

On the other hand, if the parking brake switch 9 is manipulated by the user, the parking brake valve 8 switches over such that the oil discharged by the pump 2b may return to a tank 25 by the relief valve 22. Then the pilot pressure applied to the pilot check valve 6 is depressurized, thus the pilot check valve 6 switches over to its closed state such that the oil supplied to the parking brake cylinder 10 may return to the tank 25 by a resilient force of a spring of the parking brake cylinder 10. Therefore, the parking brake can be kept locked.

In the work brake apparatus for a wheel type excavator, if the service brake pedal 5a is pressed by the user when the parking brake is kept locked, the service brake valve 5b switches over such that the oil may be supplied to the service brake cylinder 7 through the pilot check valve 6. Then, the service brake is applied by the pilot check valve 6. Therefore, the equipment can be prevented from being pulled by an excavating power.

Also, when the suspension device operates, if a suspension locking switch 12 is manipulated by the user, a suspension locking solenoid valve 11 switches over such that a pilot pressure to a suspension locking valve 13 may be depressurized. Then, the suspension locking valve 13 switches over as shown in FIG. 1 such that a closed circuit may be formed between the suspension locking valve 13 and a suspension locking cylinder 14. Therefore, the suspension device can be kept locked and the equipment can be prevented from shaking by an excavating power.

The state of the equipment described above is referred to as an operating state of the work brake apparatus, and is important to prevent the equipment from shaking and being pulled by an excavating power.

In a hydraulic apparatus for travelling the wheel type excavator, the oil discharged by the pump 2b is pressurized by the relief valve 22, and the oil in pressure is supplied to a forward/backward solenoid valve 16 by manipulating a travelling controller 15. At this time, the forward/backward solenoid valve 16 switches over to its neutral, forward or backward state in response to the position of the forward/backward lever 19 as shown in FIG. 1, and the oil from the forward/backward solenoid valve 16 applies a pilot pressure to a pair of ports 17a, 17b of a main control valve 17.

And, the oil discharged by a pump 2c is pressurized by a relief valve 24. If the oil is supplied to a travelling motor 18 to drive a gear box 21 in response to the state of the main control valve 17, the equipment can travel forward or backward.

However, in order to keep the work brake apparatus in the operating state when the excavator is desired to work, the user need to manipulate all the devices respectively such that the forward/backward lever may be in its neutral position, and the parking brake may be kept locked, and the service brake may be applied, and the suspension device may be kept locked. On the other hand, the user need to manipulate all the devices reversely to travel the equipment. It is complicated for the user to manipulate all the devices respectively.

And, when the equipment is at work, if the service brake device breaks and slides by an excavating power, the parking brake device is pulled and breaks, too. Moreover, if the parking brake device is included in the gear box, a failure of the parking brake device results in a successive failure of the gear box, so the equipment cannot travel. And, also in the case that the service brake is not taken off from a failure of the pilot check valve, the equipment cannot travel.

SUMMARY OF THE INVENTION

It is an object of the present invention to provide a work brake apparatus for a wheel type excavator, whereby the equipment can be prevented from shaking and being pulled via keeping a suspension device locked and via applying a service brake when the equipment is at work, and whereby the suspension device can be kept unlocked and the service brake can be taken off automatically when the equipment travels.

It is another object of the present invention to provide a work brake apparatus for a wheel type excavator, wherein a service brake hydraulic line is formed separately from a parking brake hydraulic line to elimanate a pilot check valve.

The above objects are achieved by providing a work brake apparatus for a wheel type excavator having a travelling device in which a travelling motor is provided, the travelling motor being driven by applying a predetermined pilot pressure to a main control valve as a forward/backward solenoid valve switches over in response to a predetermined signal selected by a forward/backward lever; a suspension device in which a suspension locking cylinder is provided, the suspension locking cylinder being driven by applying a pilot pressure to a suspension locking valve as a suspension locking solenoid valve switches over in response to a predetermined signal; and a service brake device in which a service brake cylinder is provided, the service brake cylinder being driven by supplying the oil from a cut-off valve thereto as a service brake valve switches over in response to a predetermined signal, the work brake apparatus comprising:

a first means, which is connected to the forward/backward lever of the travelling device, for unlocking the suspension device as the suspension locking solenoid valve switches over in response to a predetermined signal when the forward/backward lever switches over to its forward or backward position, and a second means, which is connected to the forward/backward lever of the travelling device, for keeping the service brake applied as the service brake valve switches over in response to a predetermined pilot pressure when the forward/backward lever switches over to its neutral position.

In accordance with the first 0preferred feature 1 of the present invention, the first means comprises: a second circuit which supplies a predetermined signal when the forward/backward lever is in its forward position; a third circuit which supplies a predetermined signal when the forward/backward lever is in its backward position; a relay which is connected to the second circuit and to the third circuit; and a switch which is turned on/off by the relay to supply a predetermined signal to the suspension locking solenoid valve.

In accordance with the second preferred feature 2 of the present invention, the second means comprises: a work brake solenoid valve which is installed in a hydraulic passage, the hydraulic passage being branched off the cut-off valve for applying a pilot pressure to the service brake valve; and a first circuit, which is connected to the forward/backward lever of the travelling device, for applying a predetermined signal to the work brake solenoid valve when the forward/backward lever is in its neutral position.

In accordance with the third preferred feature 3 of the present invention, the work brake solenoid valve can switch over to a first state in which the pilot oil is supplied to the service brake valve from the cut-off valve, or to a second state in which the pilot oil is not supplied to the service brake valve from the cut-off valve.

In accordance with the fourth preferred feature 4 of the present invention, a first diode is installed in the second circuit to prevent a predetermined current from flowing back to the second circuit when the current is desired to flow to the third circuit, and a second diode is installed in the third circuit to prevent a predetermined current from flowing back to the third circuit when the current is desired to flow to the second circuit.

DETAILED DESCRIPTION OF THE INVENTION

Figure 1:
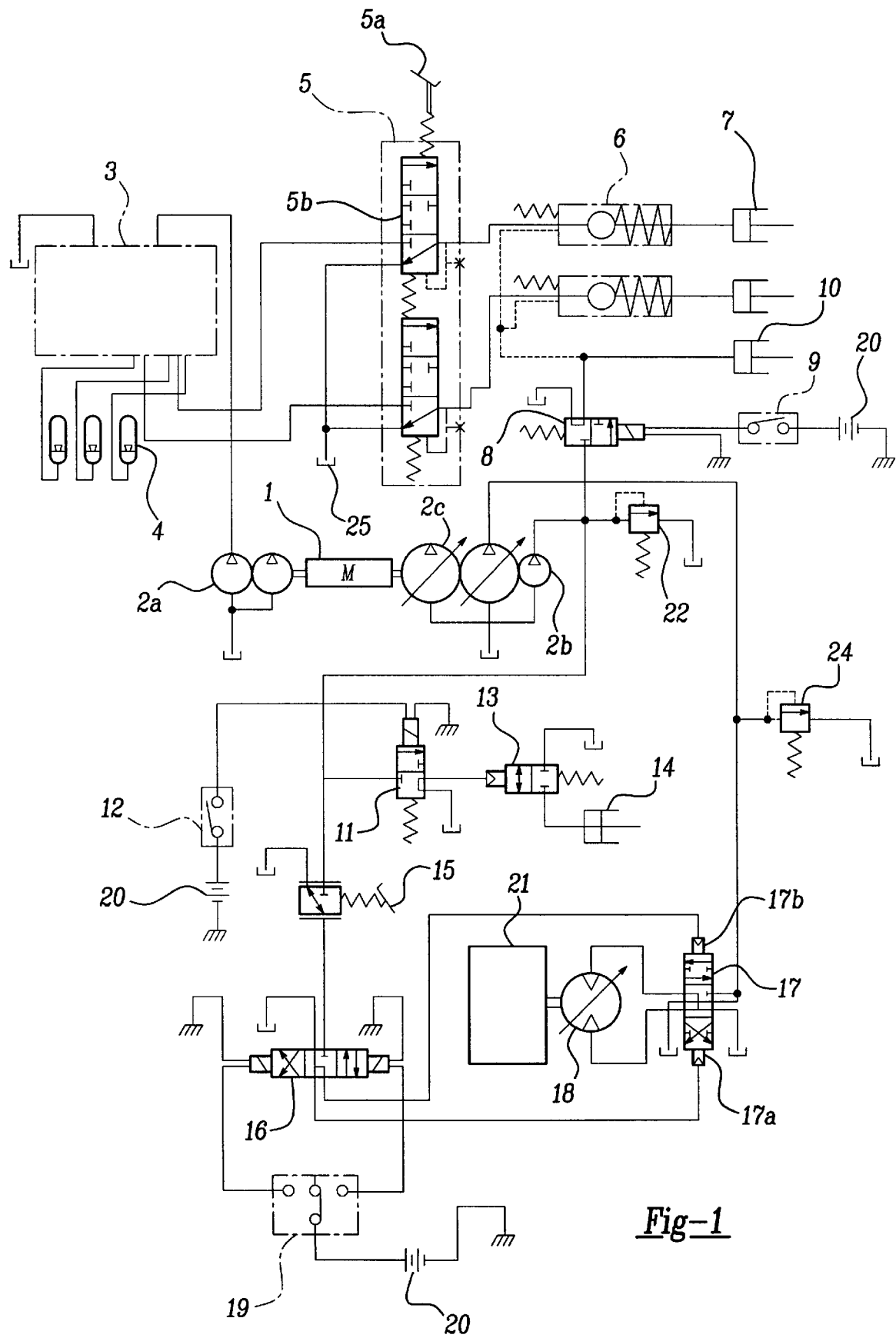
FIG. 1 is a hydraulic circuit diagram showing a conventional work brake apparatus for a wheel type excavator.

In the following, one preferred embodiment of the present invention will be described in detail with reference to the accompanying drawings.

A work brake apparatus according to the present invention is adapted to a wheel type excavator, the wheel type excavator having: a travelling device in which a travelling motor 18 is provided, the travelling motor 18 being driven by applying a predetermined pilot pressure to a main control valve 17 as a forward/backward solenoid valve 16 switches over in response to a predetermined signal selected by a forward/backward lever 19; a suspension device in which a suspension locking cylinder 14 is provided, the suspension locking cylinder 14 being driven by applying a pilot pressure to a suspension locking valve 13 as a suspension locking solenoid valve 11 switches over in response to a predetermined signal: and a service brake device in which a service brake cylinder 7 is provided, the service brake cylinder 7 being driven by supplying the oil from a cut-off valve 3 thereto as a service brake valve 5 switches over in response to a predetermined signal.

The work brake apparatus for a wheel type excavator according to the present invention comprises: a first means, which is connected to the forward/backward lever 19 of the travelling device, for unlocking the suspension device as the suspension locking solenoid valve 11 switches over in response to a predetermined signal when the forward/backward lever 19 switches over to its forward or backward position, and a second means, which is connected to the forward/backward lever 19 of the travelling device, for keeping the service brake applied as the service brake valve 5 switches over in response to a predetermined pilot pressure when the forward/backward lever 19 switches over to its neutral position.

The first means comprises: a second circuit 23a which supplies a predetermined signal when the forward/backward lever 19 is in its forward position; a third circuit 23b which supplies a predetermined signal when the forward/backward lever 19 is in its backward position; a relay 27 which is connected to the second circuit 23a and to the third circuit 23b; and a switch 28, which is turned on/off by the relay 27, for applying a predetermined signal to the suspension locking solenoid valve 11.

The second means comprises: a work brake solenoid valve 26 which is installed in a hydraulic passage 4a, the hydraulic passage 4a being branched off the cut-off valve 3 for applying a pilot pressure to the service brake valve 5b; a first circuit 26a, which is connected to the forward/backward lever 19 of the travelling device, for applying a predetermined signal to the work brake solenoid valve 26 when the forward/backward lever 19 is in its neutral position.

The work brake solenoid valve 26 can be in its first state in which the pilot oil is supplied to the service brake valve 5b from the cut-off valve 3, and can switch over to its second state where the pilot oil is not supplied to the service brake valve 5b from the cut-off valve 3.

A first diode 23A is installed in the second circuit 23a to prevent a predetermined current from flowing back to the second circuit 23a when the current is desired to flow to the third circuit 23b, and a second diode 23B is installed in the third circuit 23b to prevent a predetermined current from flowing back to the third circuit 23b when the current is desired to flow to the second circuit 23a.

The operation and the effect of this embodiment will be described below.

Figure 2A:
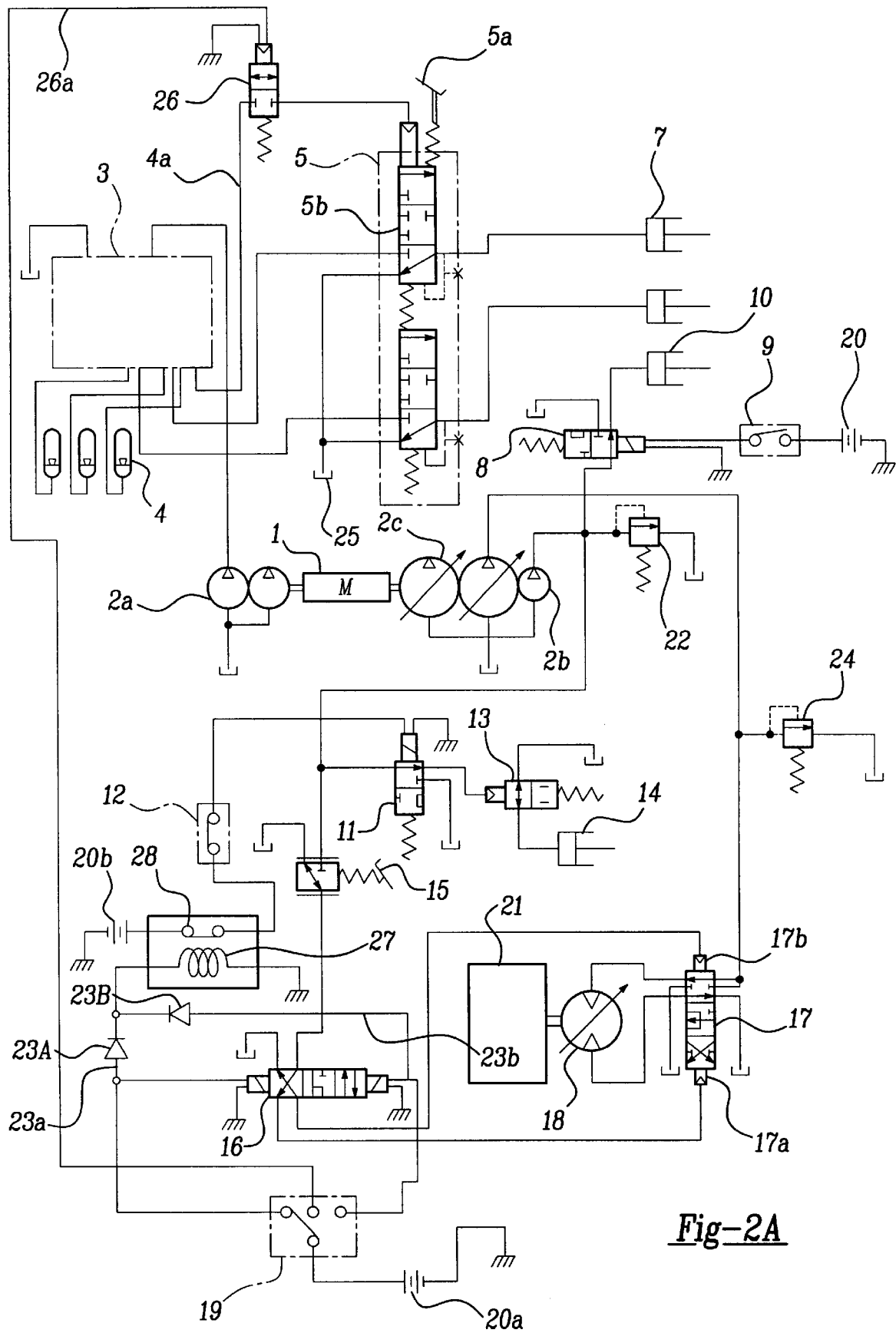
FIGS. 2 (A), (B) are hydraulic circuit diagrams for explaining forward/backward travelling of a wheel type excavator wherein a work brake apparatus according to one preferred embodiment of the present invention is installed.

FIG. 2(A) shows a hydraulic circuit diagram for explaining forward travelling, wherein a parking brake switch 9 and a suspension locking switch 12 are turned on, and the forward/backward lever 19 is in its forward position.

When the current from a battery 20a of the equipment is supplied to the left side of the forward/backward solenoid valve 16 through the forward/backward lever 19, the left side of the solenoid is magnetized and the forward/backward solenoid valve 16 switches over as shown in FIG. 2(A). Then, the current from the forward/backward solenoid valve 16 is supplied to the relay 27 through the first diode 23A in the second circuit 23a, so the switch 28 is turned on. Therefore, the current from a battery 20b is supplied to the suspension locking solenoid valve 11 through the suspension locking switch 12 such that the suspension device may be kept unlocked.

The current from the forward/backward solenoid valve 16 is prevented from inducing the right side of the solenoid of the forward/backward solenoid valve 16 by the second diode 23B in the third circuit 23b. Therefore, the forward/backward solenoid valve 16 is prevented from switching over to its neutral state.

The oil discharged by a pump 2b is pressurized by a relief valve 22 and then is supplied to an inlet port of a travelling control valve 15. If the user manipulates a pedal of the travelling control valve 15, the oil is supplied to a travelling spool 17a of the main control valve 17 through the forward/backward solenoid valve 16.

The spool 17a switches over to a position as shown in FIG. 2(A). At this time, the oil discharged by a pump 2c is pressurized by a relief valve 24 and then is supplied to a travelling motor 18 through the main control valve 17 to drive a gear box 21. Therefore, the equipment travelles forward.

Figure 2B:
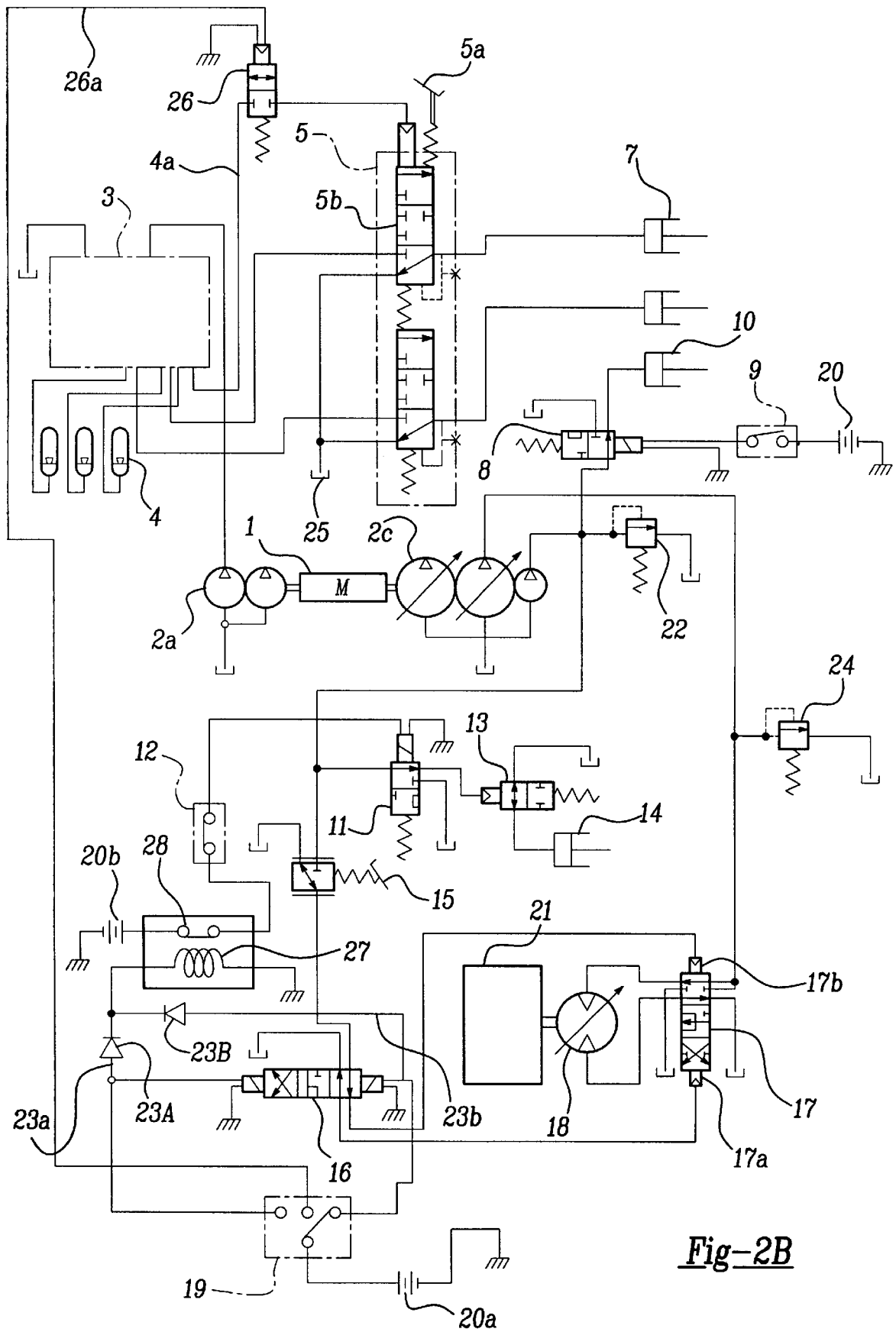

FIG. 2(B) shows a hydraulic circuit diagram for explaining backward travelling, wherein the parking brake switch 9 and the suspension locking switch 12 are turned on, and the forward/backward lever 19 is in its backward position.

When current from the battery 20a of the equipment is supplied to the right side of the forward/backward solenoid valve 16 through the forward/backward lever 19, the right side of the solenoid is magnetized and the forward/backward solenoid valve 16 switches over as shown in FIG. 2(B). Then, the current from the forward/backward solenoid valve 16 is supplied to the relay 27 through the second diode 23B in the third circuit 23b, so the switch 28 is turned on. Therefore, the current from the battery 20b is supplied to the suspension locking solenoid valve 11 through the suspension locking switch 12 such that the suspension device may be kept unlocked.

The current from the forward/backward solenoid valve 16 is prevented from inducing the left side of the solenoid of the forward/backward solenoid valve 16 by the first diode 23A in the second circuit 23a. Therefore, the forward/backward solenoid valve 16 is prevented from switching over to its neutral state.

The oil discharged by the pump 2b is pressurized by the relief valve 22 and then is supplied to the inlet port of a travelling control valve 15. If the user manipulates the pedal of the travelling control valve 15, the oil is supplied to a travelling spool 17b of the main control valve 17 through the forward/backward solenoid valve 16.

The spool 17b switches over to a position as shown in FIG. 2 (B). At this time, the oil discharged by the pump 2c is pressurized by the relief valve 24 and then is supplied to the travelling motor 18 through the main control valve 17 to drive the gear box 21. Therefore, the equipment travelles backward.

Figure 3:
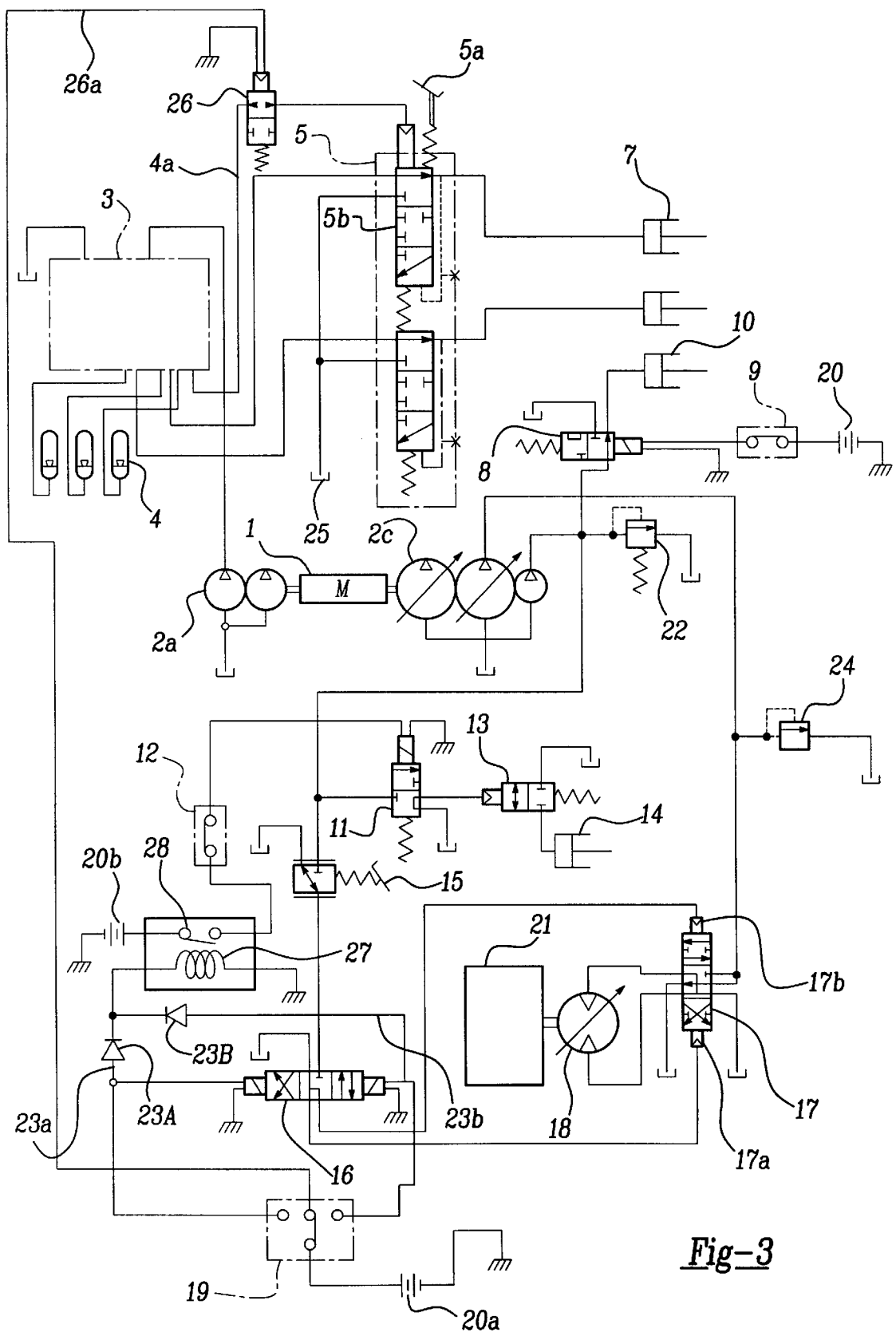
FIG. 3 is a hydraulic circuit diagram for explaining the operation of a work brake apparatus according to one preferred embodiment of the present invention.

On the other hand, FIG. 3 shows a hydraulic circuit diagram for explaining operation of the work brake apparatus, wherein the forward/backward lever 19 is in its neutral position when the equipment is desired to work.

When the forward/backward lever 19 is in its neutral position, the current from the battery 20a of the equipment is supplied to the work brake solenoid valve 26 through the first circuit 26a which is connected to the forward/backward lever 19, and the spool of the work brake solenoid valve 26 switches over to a position as shown in FIG. 3. Then, the oil discharged by a pump 2a driven by an engine 1 is supplied to the inlet port of the work brake solenoid valve 26, so the oil applies a pilot pressure to the service brake valve 5b through the work brake solenoid valve 26.

Therefore, even if the service brake pedal 5a is not pressed by the user, the spool of the service brake valve 5b switches to a position as shown in FIG. 3, so the oil accumulated in the accumulator 4 is supplied to the service brake cylinder 7. Therefore, the service brake is kept applied, and the equipment is prevented from being pulled by excavating power.

The current from the battery 20b of the equipment is not applied to the suspension locking switch 12 such that the suspension locking solenoid valve 11 may switch over as shown in FIG. 3.

When the pilot pressure applied to the suspension locking valve 13 is depressurized, the suspension locking valve 13 switches over as shown in FIG. 3, and a closed circuit is formed between the suspension locking valve 13 and the suspension locking cylinder 14. Therefore, the suspension device is kept locked, and the equipment is prevented from shaking by excavating power.

If the forward/backward lever 19 switches over to its neutral position, the service brake is kept applied and the suspension device is kept locked automatically. Therefore the equipment is kept in the operating state of the work brake apparatus.

On the other hand, if the forward/backward lever switches over to its forward or backward position to travel the equipment, the current from the battery 20b of the equipment is supplied to the suspension locking switch 12 such that the suspension locking solenoid valve 11 may switch over as shown in FIGS. 2(A) or (B).

When the oil discharged by the pump 2b is pressurized by the relief valve 22, and applies a pilot pressure to the suspension locking valve 13 through the suspension locking solenoid valve 11, the suspension locking valve 13 switches over as shown in FIGS. 2(A) or (B). Therefore, the suspension locking device is kept unlocked.

As described in the above, according to the work brake apparatus for a wheel type excavcator of the present invention: the work brake apparatus of the equipment can kept in the operating state by simply switching the forward/backward lever in its neutral position; a service brake hydraulic line is formed separately from a parking brake hydraulic line to elimanate a pilot check valve and the piping related; the service brake can be prevented from not being unlocked due to a failure of the pilot check valve; moreover, because the parking brake device and the service brake device do not interlock, the parking brake device can be prevented from breaking and the gear box can be prevented from successively breaking due to a failure of the service brake device.

What is claimed is:

1. A work brake apparatus for a wheel type excavator having a travelling device in which a travelling motor is provided, the travelling motor being driven by applying a predetermined pilot pressure to a main control valve as a forward/backward solenoid valve switches over in response to a predetermined signal selected by a forward/backward lever; a suspension device in which a suspension locking cylinder is provided, the suspension locking cylinder being driven by applying a pilot pressure to a suspension locking valve as a suspension locking solenoid valve switches over in response to a predetermined signal; and a service brake device in which a service brake cylinder is provided, the service brake cylinder being driven by supplying the oil from a cut-off valve thereto as a service brake valve switches over in response to a predetermined signal, the work brake apparatus comprising:

- a first means, which is connected to the forward/backward lever of said travelling device, for unlocking the suspension device as said suspension locking solenoid valve switches over in response to a predetermined signal when the forward/backward lever switches over to its forward or backward position, and
- a second means, which is connected to the forward/backward lever of said travelling device, for keeping the service brake applied as said service brake valve switches over in response to a predetermined pilot pressure when the forward/backward lever switches over to its neutral position.

2. A work brake apparatus for a wheel type excavator as claimed in claim 1, characterized in that said second means comprises:

- a work brake solenoid valve which is installed in a hydraulic passage, the hydraulic passage being branched off said cut-off valve for applying a pilot pressure to said service brake valve, and
- a first circuit, which is connected to the forward/backward lever of said travelling device, for applying a predetermined signal to said work brake solenoid valve when the forward/backward lever is in its neutral position.

3. A work brake apparatus for a wheel type excavator as claimed in claim 1, characterized in that said first means comprises:

- a second circuit which supplies a predetermined signal when said forward/backward lever is in its forward position,
- a third circuit which supplies a predetermined signal when said forward/backward lever is in its backward position,
- a relay which is connected to said second circuit and to said third circuit, and
- a switch which is turned on/off by said relay to supply a predetermined signal to said suspension locking solenoid valve.

4. A work brake apparatus for a wheel type excavator as claimed in claim 3, characterized in that said work brake solenoid valve can switch over to:

- a first state in which the pilot oil is supplied to said service brake valve from said cut-off valve, or
- a second state in which the pilot oil is not supplied to said service brake valve from said cut-off valve.

5. A work brake apparatus for a wheel type excavator as claimed in claim 2, characterized in that it further comprises:

- a first diode, which is installed in the second circuit, for preventing a predetermined current from flowing back to the second circuit when the current is desired to flow to the third circuit, and
- a second diode, which is installed in the third circuit, for preventing a predetermined current from flowing back to the third circuit when the current is desired to flow to the second circuit.

* * * * *